United States Patent
Bates et al.

(10) Patent No.: US 6,745,227 B1
(45) Date of Patent: Jun. 1, 2004

(54) METHOD, ARTICLE OF MANUFACTURE AND APPARATUS FOR PROVIDING BROWSING INFORMATION

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 09/620,006

(22) Filed: Jul. 20, 2000

(51) Int. Cl.[7] .............................................. G06F 15/16
(52) U.S. Cl. ...................................... 709/203; 715/526
(58) Field of Search ................................. 709/206, 201, 709/200, 217, 218, 219, 203; 707/104.1; 715/501.1, 528, 529, 526

(56) References Cited

U.S. PATENT DOCUMENTS

| | | | | |
|---|---|---|---|---|
| 5,794,236 A | * | 8/1998 | Mehrle | 707/5 |
| 5,845,301 A | * | 12/1998 | Rivette et al. | 715/512 |
| 5,890,171 A | * | 3/1999 | Blumer et al. | 715/501.1 |
| 5,893,109 A | * | 4/1999 | DeRose et al. | 707/104.1 |
| 5,923,845 A | * | 7/1999 | Kamiya et al. | 709/206 |
| 5,983,244 A | * | 11/1999 | Nation | 715/501.1 |
| 5,995,099 A | * | 11/1999 | Horstmann | 715/501.1 |
| 6,006,236 A | * | 12/1999 | Young | 707/103 R |

* cited by examiner

Primary Examiner—Marc D. Thompson
(74) Attorney, Agent, or Firm—Moser Patterson & Sheridan, LLP

(57) ABSTRACT

A method, article of manufacture, and apparatus for providing browsing information to a user browsing a plurality of network addresses using a browsing program. Specifically, the invention renders first electronic document containing a link that points to a second electronic document, and renders the link in a first, second or third manner. The link is rendered in a first manner if the second electronic document was previously accessed from the first electronic document or a recently accessed electronic document. The link is rendered in a second manner if the second electronic document was previously accessed from another document other than the first electronic document or the recently accessed electronic document. The link is rendered in a third manner if the second electronic document was previously unaccessed.

35 Claims, 5 Drawing Sheets

METHOD, ARTICLE OF MANUFACTURE AND APPARATUS FOR PROVIDING BROWSING INFORMATION

BACKGROUND OF THE INVENTION

1. Field of the Invention

The invention relates to information processing. More particularly, the invention relates to a method, article of manufacture and apparatus for providing browsing information to a user browsing a plurality of network addresses using a browsing program.

2. Background of the Related Art

Users of client computers search for and retrieve various forms of data from server computers. The client computers and server computers communicate via a network of other computers, e.g., the Internet. Transactions and data transfer between a client computer and a particular server computer is performed according to a Hypertext Transfer Protocol (HTTP) using a standard page description language known as Hypertext Markup Language (HTML). One feature under HTML is to provide a link that references an electronic document or web page at a network address identified by a Uniform Resource Locator (URL).

To facilitate the search and retrieval of data, an HTML-compatible browser program is typically installed on a client computer. A user may utilize the browser program to search and view different web pages from various server computers at different network addresses or URLs. In particular, a user may select or click on a link to view another web page referenced by that link. Once a link has been selected, the browser program generally changes the color of the link to indicate that the referenced web page has been visited.

Although changing the color of the link is useful to indicate that a referenced web page has been previously visited, such changing of color may also mislead or confuse the user.

Consider the example when the user utilizes a browser program to visit a web page. The web page often contains a link that points to another web page. If the user previously visited the referenced web page, the browser program typically changes the color of the link. However, the user may have visited the referenced web page in a different context, e.g., "out of context," with respect to the currently displayed web page. Such "out of context" web pages may include web pages that were neither previously visited from the currently displayed web page nor previously visited from another recently visited web page. In this case, if the browser program changes the color of the link, the user may skip over, i.e., not consider, the "out of context" web page. Further, if the user thinks that the previously visited web page was visited from the currently displayed web page, the user may not be able to properly distinguish between the perceived and actual context of the previously visited web page.

Therefore, a need exists for a method, article of manufacture and apparatus for identifying the context of a previously visited and referenced web site to a currently displayed web site.

SUMMARY OF THE INVENTION

The invention provides a method, article of manufacture and apparatus for providing browsing information to a user browsing a plurality of network addresses using a browsing program. Specifically, the method comprises rendering a first electronic document containing a link that points to a second electronic document, and rendering the link in a first, second or third manner. The link is rendered in a first manner if the second electronic document was previously accessed from at least one of the first electronic document and a recently accessed electronic document. The link is rendered in a second manner if the second electronic document was previously accessed from another document other than at least one of the first electronic document and the recently accessed electronic document. The link is rendered in a third manner if the second electronic document was previously unaccessed.

In another embodiment, the invention also provides an apparatus comprising a storage device and a microprocessor coupled to the storage device. The storage device stores a browser program. Upon retrieving and executing the browser program, the microprocessor renders a first electronic document containing a link that points to a second electronic document, and renders the link in a first, second or third manner. The microprocessor renders the link in a first manner if the second electronic document was previously accessed from at least one of the first electronic document and a recently accessed electronic document. The microprocessor renders the link in a second manner if the second electronic document was previously accessed from another electronic document other than at least one of the first electronic document and the recently accessed electronic document. The microprocessor renders the link in a third manner if the second electronic document was previously unaccessed.

Additionally, a computer readable medium storing a software program is provided, where the software program, when executed by a computer, causes the computer to perform a method. In one embodiment of the computer readable medium, the method comprises rendering a first electronic document containing a link that points to a second electronic document, and rendering the link in a first, second or third manner. The link is rendered in a first manner if the second electronic document was previously accessed from at least one of the first electronic document and a recently accessed electronic document. The link is rendered in a second manner if the second electronic document was previously accessed from another document other than at least one of the first electronic document and the recently accessed electronic document. The link is rendered in a third manner if the second electronic document was previously unaccessed.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The present invention is directed to providing browsing information to a user browsing a plurality of network addresses using a browsing program. Specifically, the invention renders a first electronic document containing a link that points to a second electronic document, and renders the link in a first, second or third manner. The link is rendered in a first manner if the second electronic document was previously accessed from the first electronic document or a recently accessed electronic document. The link is rendered in a second manner if the second electronic document was previously accessed from another document other than the first electronic document or the recently accessed electronic document. The link is rendered in a third manner if the second electronic document was previously unaccessed.

Figure 1:
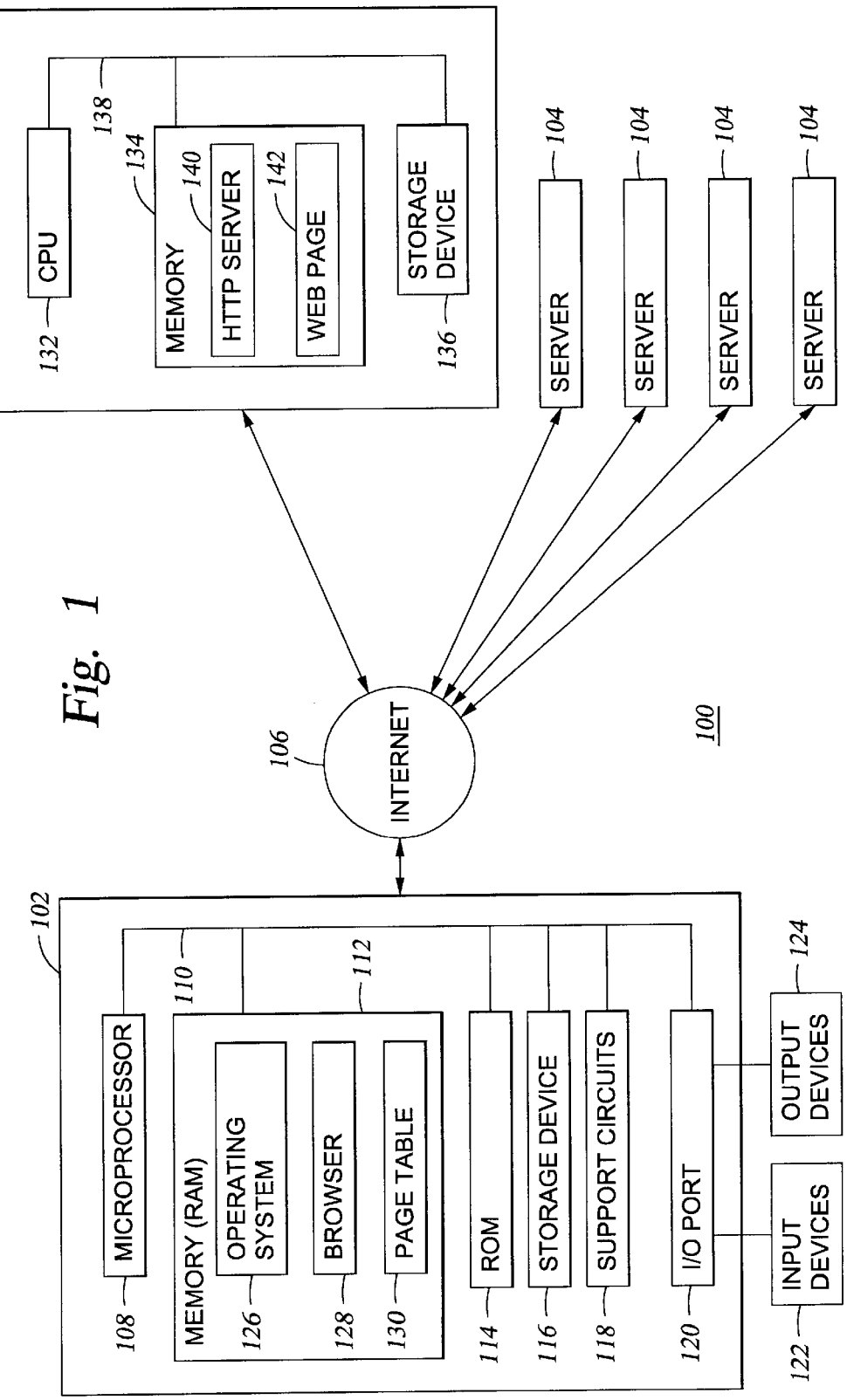
FIG. 1 depicts a simplified block diagram of a computer network system that benefits from the present invention.

FIG. 1 depicts a computer network system 100 in which the preferred embodiment of the invention may be implemented. Specifically, the computer network system 100 generally comprises a client (e.g. user's) computer 102 and at least one server computer 104. Five such server computers 104 are shown in FIG. 1. The client computer 102 and the server computer 104 may be the components of the same computer network system, i.e., an Internet, or may be connected via a public network 106, such as the Internet.

The client computer 102 comprises a microprocessor 108 coupled to various components via a bus 110. Specifically, the bus 110 couples the microprocessor 108, a random access memory (RAM) 112, a read only memory (ROM) 114, a memory storage 116, support circuits 118, and an input/output port 120. The microprocessor 108 receives information from each of the computer components coupled to the system bus 108 and performs system operations based upon the requirements of a software operating system 126 and application software, e.g., a web browser 128. Illustratively, the microprocessor 110 may comprise an Intel PENTIUM® type processor or the like.

The RAM 112 is volatile memory that contains the data and programming structures necessary for the operation of the client computer 102. Illustratively, the RAM 112 is shown containing the operating system 126, application software, e.g., a browser program 128, and a page table 130. Although the RAM 112 is shown as a single entity, the RAM 112 may also comprise a plurality of modules and may exist at multiple levels, e.g., high-speed registers and caches, low-speed and larger dynamic random access memory (DRAM) chips. The data and programming structures can be loaded into the RAM 112 from the storage device 116 as required. The storage device 116 may comprise a hard drive or some other Direct Access Storage Device (DASD), where software can be permanently stored. Although shown as a single unit, the storage device 116 could be a combination of fixed and/or removable storage devices, such as fixed disc drives, floppy disc drives, tape drives, removable memory cards, or optical storage. The ROM 114 typically includes a Basic Input-Output System (BIOS) program, which controls basic hardware operations such as the interaction of the microprocessor 108, storage device 116, an input device 122, or an output device 124. RAM 112, ROM 114 and the storage device 116 could be part of one virtual address space spanning multiple primary and secondary storage devices.

Support circuits 118 include controllers for the storage device 114, floppy drive, graphics display, and the like. The I/O port 120 includes various controllers for input devices 122, and output devices 124. The input device 122 may comprise a keyboard, keypad, light-pen, touch-screen, track-ball or any device capable of providing input to the client computer 102. The output device 124 may preferably comprise a display screen. Although the input device 122 is shown separately from the output device 124, the input device 122 may also be combined with the output device 124. For example, a display screen may have an integrated touch-screen or an integrated keyboard.

The operating system 126 is capable of interfacing with all of the hardware components of the computer 102. One such operating system 126 is the IBM OS/2 WARP 4.0® system.

The web browser or browser program 128 is an application program that allows viewing the content from server computers 104 and navigating among various server computers 104 via the Internet 106. In particular, the web browser 128 is a program, which is capable of parsing and presenting an electronic document, e.g., a web page, written in hypertext markup language (HTML) or other programming languages. The browser 128 in the client computer 102 is the local browser utilized by a user, and is coupled to the Internet 106 via a communications medium such as telephone wire, cable, wireless device, and the like. Examples of the browser program 128 include the Netscape Navigator and the Internet Explorer. A graphical user interface (GUI) of one such browser program 128 is shown below in FIG. 2.

Each server computer 104 comprises a CPU 132 coupled to a memory 134 and a storage device 136 via a bus 138. Memory 134 is a random access memory sufficiently large to hold the necessary programming and data structures that are located on the server computer 104 according to a network information address, e.g. a Uniform Resource Locator (URL). The memory 134 is illustratively shown containing a Hypertext Transfer Protocol (HTTP) server process 140 and an electronic document (illustratively a web page 142). The HTTP server process 140 is utilized to service requests from the client computer 102 regarding electronic HTML documents or web pages. The HTTP server process 140 is merely illustrative and other embodiments adapted to support any known and unknown protocols are contemplated within the scope of the present invention. The electronic document 142 is the web page accessed by a user of the browser program 128 in accordance with the present invention. The programming and data structures may be accessed and executed by the CPU 132 as needed during operation of the server computer 104.

Communications between the client computer 102 and any of the server computers 104 via the Internet 106 may occur in any standard format that allows the transfer of files or data packets from one device to another. Such communication channels may include modem connections, wired local area networks (e.g., ETHERNET or Token Ring), wireless communications, and the like. Each communications medium has its own communication protocols for transferring and receiving information from another source. For example, the transfer protocols may include protocols for modems, a File Transfer Protocol (FTP), HTTP for networked systems, and the like.

FIG. 1 is merely one hardware configuration for computer network system 100. A preferred embodiment of the present invention can apply to any comparable hardware configuration, regardless of whether the computer system is a complicated, multi-user computing apparatus, a single-user workstation or network appliance that does not have non-volatile storage of its own.

As will be described below, aspects of the preferred embodiment pertain to specific method steps implementable on computer systems. In another embodiment, the invention may be implemented as a computer program-product for use with a computer network system 100. The programs defining the functions of the preferred embodiment can be provided to a computer via a variety of signal-bearing media, which include but are not limited to, (a) information permanently stored on non-writable storage media (e.g. read-only memory devices within a computer such as read only CD-ROM disks readable by a CD-ROM or DVD drive; (b) alterable information stored on a writable storage media (e.g. floppy disks within diskette drive or hard-disk drive); or (c) information conveyed to a computer by communications medium, such as through a computer or telephone network, including wireless communication. Such signal-bearing media, when carrying computer-readable instructions that direct the functions of the present invention, represent alternative embodiments of the present invention. It may also be noted that portions of the product program may be developed and implemented independently, but when combined together are embodiments of the present invention.

Figure 2:
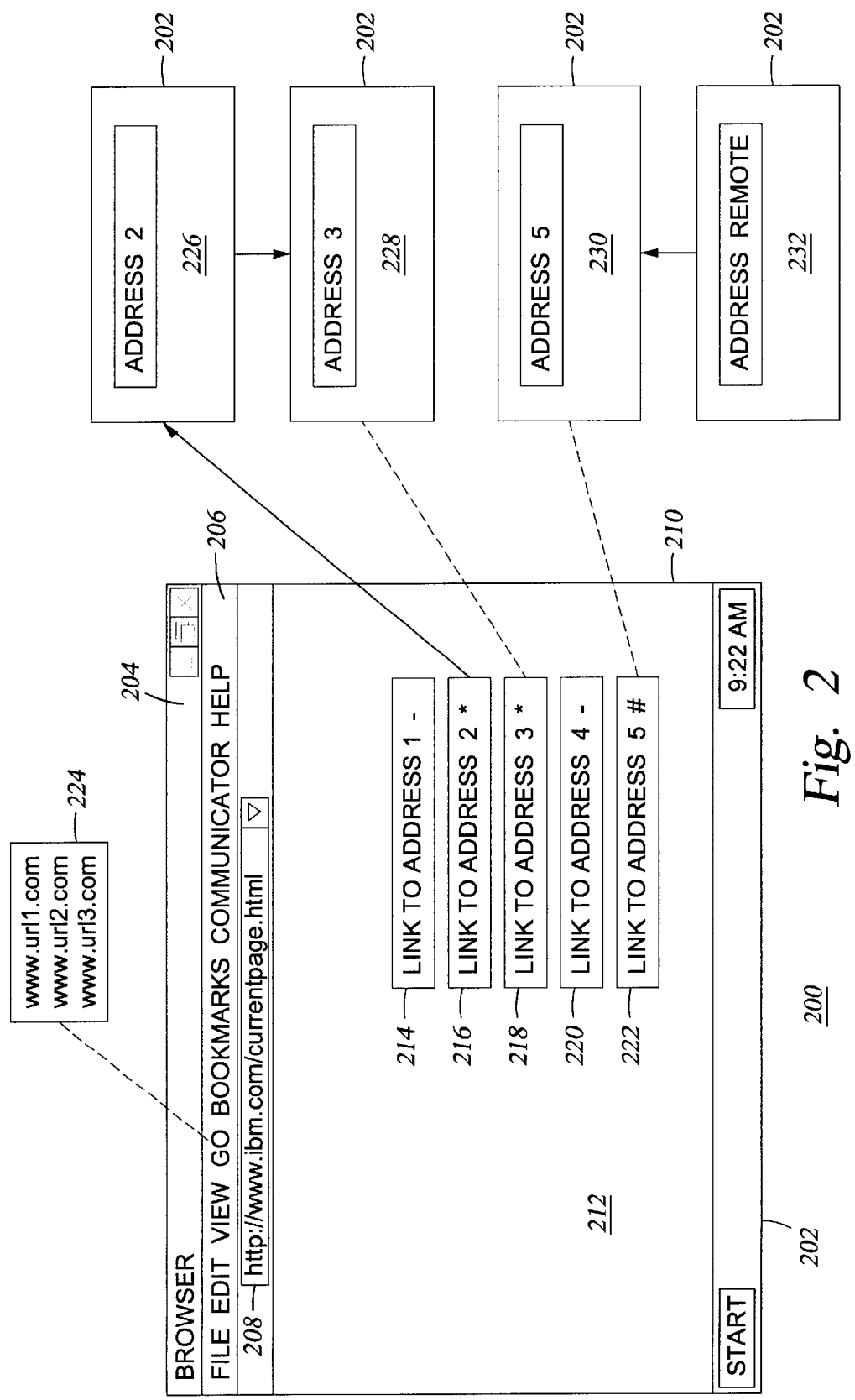
FIG. 2 depicts a browser flow of electronic documents within the computer network system of FIG. 1.

FIG. 2 depicts a browser flow of electronic documents within the computer network system 100 of FIG. 1. The browser flow is defined by a series of graphical user interfaces (GUIs) 202 provided by a browser program 128 utilized in the client computer 102. The graphical user interface (GUI) 202 is utilized for viewing electronic documents or web pages from different server computers 104. More specifically, the GUI 202 comprises a title bar 204, a plurality of menu options 206, an entry field 208 and a viewing window 210. The viewing window 210 displays an electronic document or web page 212 containing images, text, buttons, data fields, links and various other types of information.

A user of the client computer 102 may utilize the browser program 128 to browse various electronic documents or web pages from different servers 104. For example, the user may manually enter a network address, e.g., a URL, into the entry field 208 and request an electronic document at the entered network address. Alternatively, the user may open a bookmark menu from the menu options 204 and select a bookmark to access a web page referenced by that bookmark. The user may press "Back" and "Forward" buttons (not shown) in the GUI 200 to move back or forward to previously accessed web pages.

The user may also browse other electronic documents by selecting or clicking on a link, e.g., 214, contained in the electronic document 212. Illustratively, the electronic document 212 represents a base electronic document containing five links, i.e., a first link 214, a second link 216, a third link 218, a fourth link 220 and a fifth link 222. Each link 214–222 is represented as a selectable area having text, images or graphics. Each link 210 also points to an electronic document at a network address of a server computer 104.

In accordance with the present invention, each link 214–222 is displayed in the viewing window 210 in a first formatting attribute, a second formatting attribute or a third formatting attribute. Illustratively, the second link 216 and third link 218 are displayed in a first formatting attribute; the fifth link 222 is displayed in a second formatting attribute; and the first link 214 and the fourth link 220 are displayed in a third formatting attribute. The first formatting attribute is illustratively designated with "*", the second formatting attribute is illustratively designated with "#" and the third formatting attribute is designated with "--". Other examples of formatting attributes are contemplated within the scope of the present invention. Such formatting attributes include but are not limited to: flashing buttons, numerical ratings, shading, highlighting, bolding, colors, icons, checkmarks and the like.

In one example of the browser flow, as indicated by arrows in FIG. 2, a user selects the second link 216 to view an electronic document 226 and then browses another electronic document 228 directly from the electronic document 226 in the same browser session. If the user returns to the electronic document 212 (referred to as the base electronic document), the second link 216 is displayed in a first formatting attribute, since the electronic document 226 pointed to by the second link 216 is accessed from the base electronic document 212.

In one embodiment, links are also formatted with predetermined attributes in cases where the document pointed to by a link was accessed from a "recently accessed electronic document." Such recently accessed electronic documents may include electronic documents accessed in a current session of the browser program 128 and/or electronic documents in a Go menu 224 of a graphic user interface (GUT) 202. In the foregoing example, the electronic document 226 is a recently accessed electronic document. Thus, the third link 218 is also displayed in the first manner, since the electronic document 228 pointed to by the third link 218 is accessed from the recently accessed electronic document 226. Electronic documents 226–228 accessed from the current electronic document 212 or from the recently accessed electronic document 226 are considered as accessed or visited "in context" with respect to the base electronic document 212 or web page.

In another example of the browser flow, a user accesses an electronic document 230 from electronic document 232 during a prior session of the browser program 128. In a subsequent session, the user accesses the base electronic document 212. In this case, the electronic document 230 is pointed to by the fifth link 222, but is accessed from an electronic document 232 having no relation to the currently displayed electronic document 212. For illustration, it is assumed that the URL to the electronic document 232 is no longer contained in the Go menu 224. Thus, the fifth link 222 is displayed in the second formatting attribute, since the electronic document 230 is accessed from an electronic document 232 other than the current electronic document 212 or a recently accessed electronic document 226. That is, the electronic document 230 is considered as accessed or visited "out of context" with respect to the currently displayed electronic document 212. Additionally, the first link 214 and the fourth link 220 are displayed in a third formatting attribute, because the electronic documents pointed to by these links 214, 220 have not been accessed or visited by the browser program 128.

Figure 3:
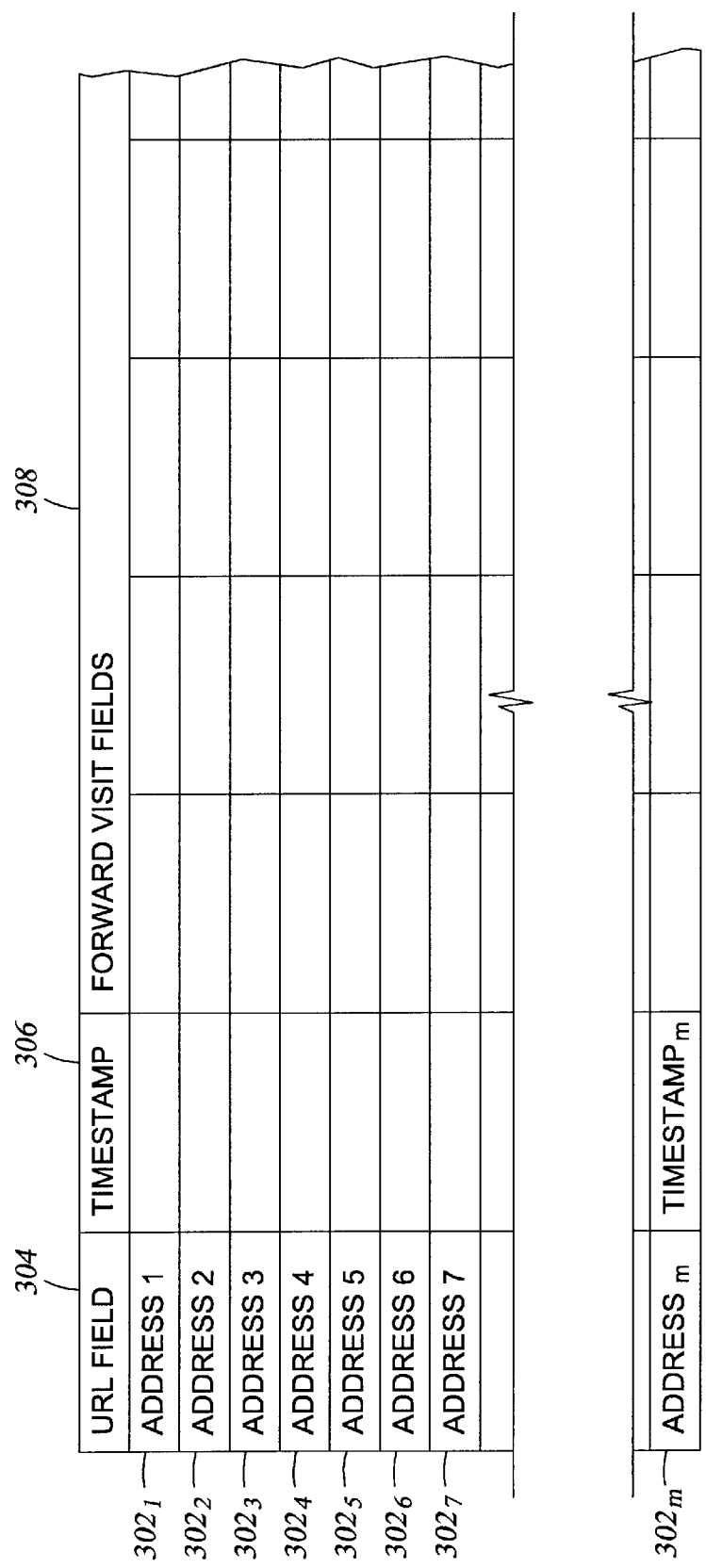
FIG. 3 depicts a data table utilized for tracking electronic documents in accordance with the present invention.

FIG. 3 depicts a page table 130, i.e., a page data structure, utilized for tracking web pages in accordance with the present invention. The page table 130 is contained in a file utilized with the browser program 128. Specifically, the page table 130 comprises a URL field 304, and a time stamp field 306, where the URL field 304 and the time stamp field 306 are provided for each electronic document entry or web page in the page table 130.

The URL field 304 includes the URL address of the electronic document (also referred to herein as the "base electronic document") associated with each electronic document entry or record in the page table 130. The electronic document entries are collectively represented as rows $302_1$, through $302_m$ in the page table 130. Each electronic document entry represents an electronic document accessed or visited using the browser program 128. In some embodiments, the URL field 304 contains a record (or electronic document entry) for each electronic document accessed or visited, regardless of the manner in which the electronic document was accessed (entry of the URL address or network address into the entry field window 208, clicking a link, etc.). In another embodiment, only those electronic documents accessed by clicking or otherwise activating a link pointing to the electronic document have a record or entry in the URL field 304.

The time stamp field 306 includes the date and time when the electronic document was last accessed. The "forward visit" field 308 contains the URL addresses of the electronic documents accessed from a base electronic document, e.g., the web page entry in the URL field 304. These electronic documents are accessed by selecting links in the base electronic document or by entering a network address of the base electronic document in the entry field 206. The URL field 304, time stamp field 306 and the "forward visit" field are utilized to determine whether another electronic document is "in context" to a currently displayed web page, i.e., whether the other electronic document is previously accessed from the base electronic document or a recently accessed electronic document. Illustrative methods of using the page table 130 are described below with reference to FIGS. 4 and 5.

Figure 4:
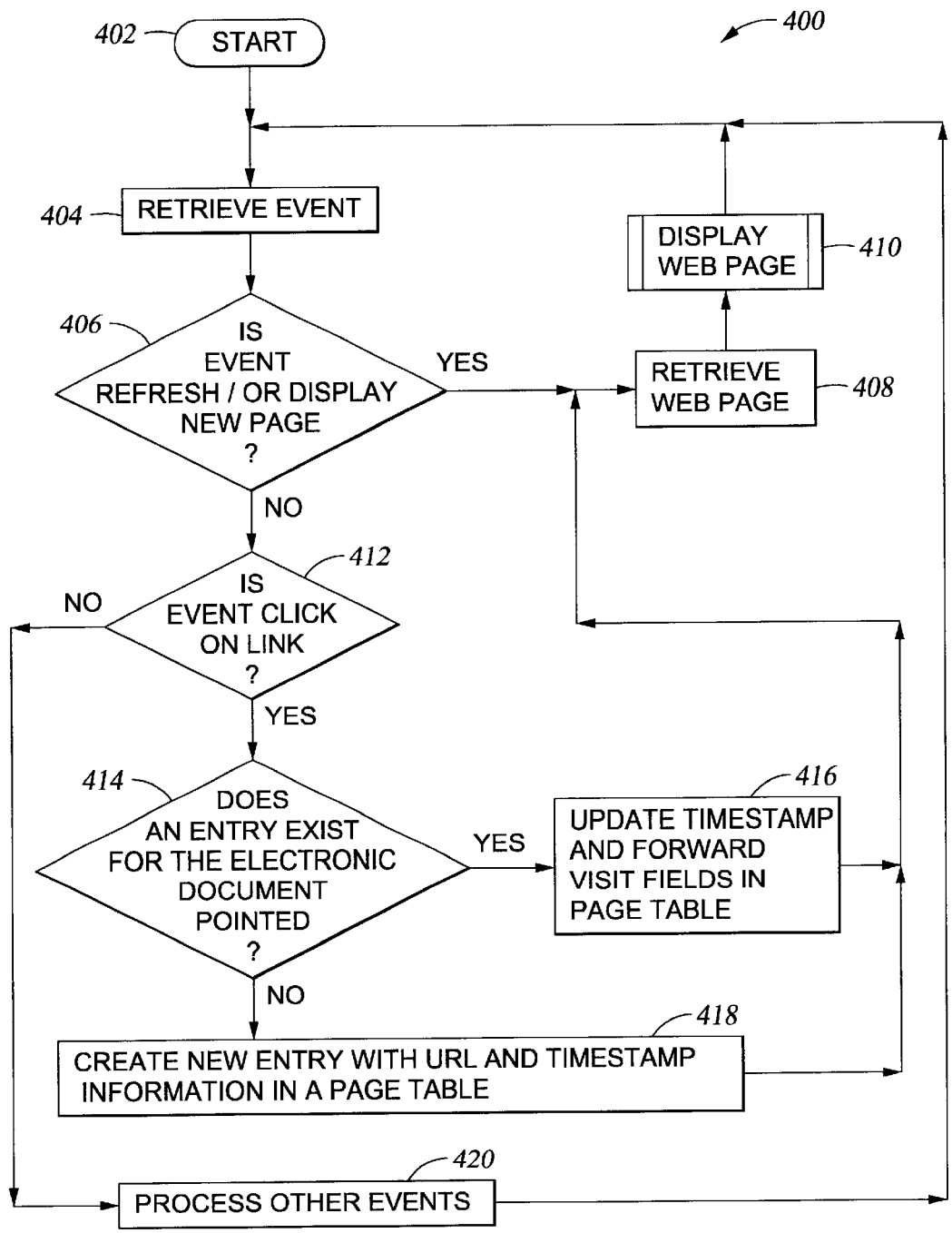
FIG. 4 depicts a flow diagram of a method for utilizing a browser program.
Figure 5:
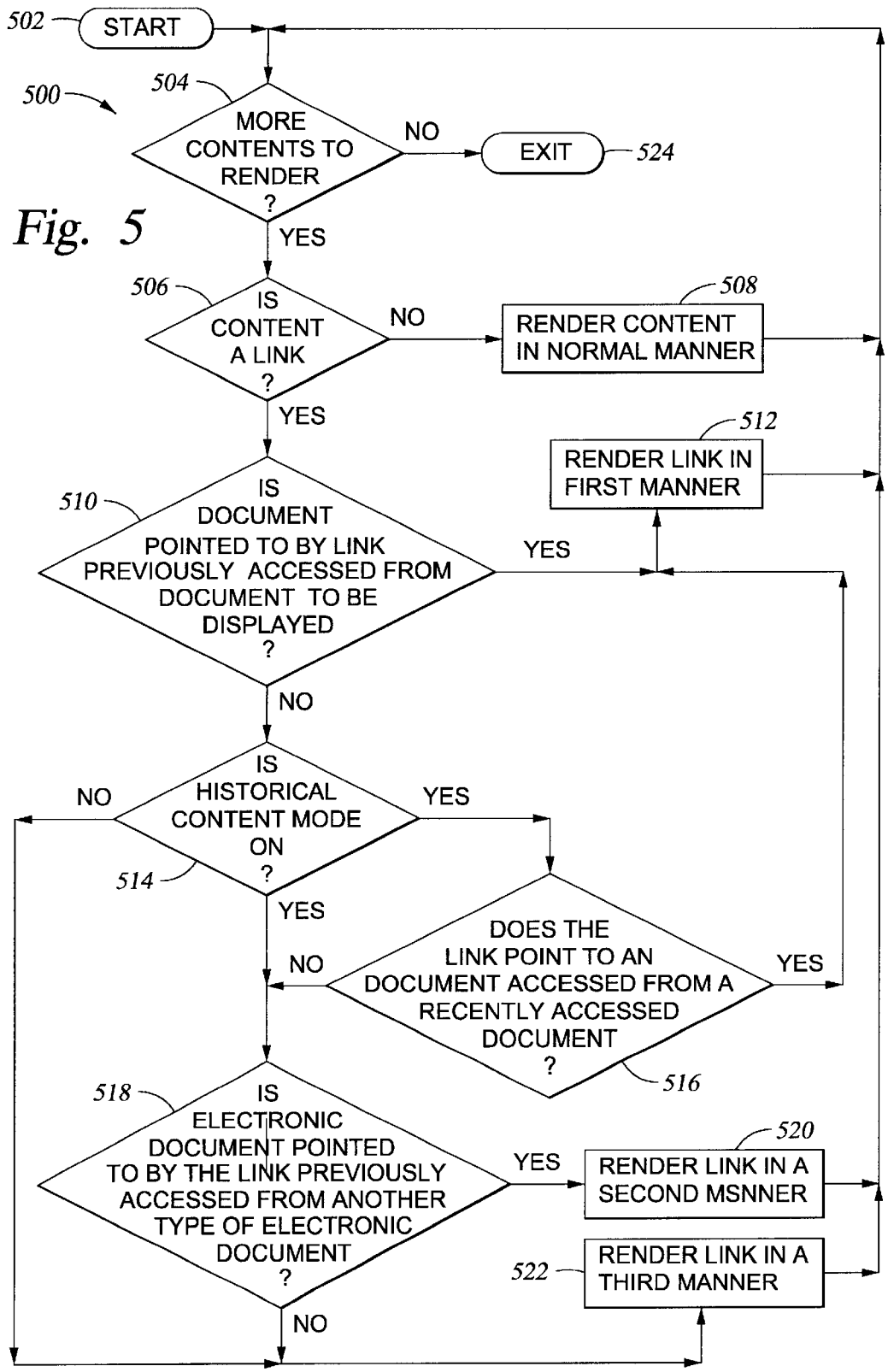
FIG. 5 depicts a flow diagram of a method for providing browsing information in accordance with the present invention.

FIG. 4 depicts a flow diagram of a method 400 utilizing a browser program 128. FIG. 5 depicts a flow diagram of a method 500 for providing browsing information in accordance with the present invention. To best understand the invention, the reader should simultaneously refer to FIG. 4 and FIG. 5.

Referring to FIG. 4, operation of the browser program 128 is embodied in a method 400 that starts at step 402 and proceeds to retrieve an event at step 404. Such events may represent a particular command from a user, e.g., displaying an electronic document or web page, or selecting a link to view another electronic document. The method 400 operates in an event-driven manner, i.e., the method 400 retrieves events and performs different steps depending on a particular event retrieved.

At step 406, the method 400 queries whether the event is to display a new electronic document, e.g., web page, or refresh a previously accessed electronic document. If the event is to display a new electronic document or refresh a previously accessed electronic document, the method 400 proceeds to retrieve the electronic document at step 408 and display the electronic document at step 410. Step 410 is embodied in a method 500 described below with respect to FIG. 5. After displaying the electronic document at step 410, the method 400 returns to retrieve the next event at step 404.

If the event is not to display a new electronic document or refresh a previously accessed electronic document, the method 400 proceeds to step 412. In this case, the method 400 queries whether the event is to click on or otherwise select a link contained in a base electronic document. If the event is to click on the link, the method 400 proceeds to step 414, where a query determines whether a record or electronic document entry exists in the page table 130 for the electronic document pointed to by the link.

If the entry exists for the electronic document pointed to by the link, the method 400 proceeds to step 416. At step 416, the time stamp field 306 is updated for the entry corresponding to the electronic document pointed to by the link, and the forward visit field 308 is updated for the entry corresponding to the base electronic document. After step 416, the method 400 proceeds to step 408, where the electronic document pointed to by the link is retrieved.

If the entry does not exist for the electronic document pointed to by the link, the method 400 proceeds to step 418, where a new entry is created for the electronic document pointed to by the link. In this case, the URL field 304 contains the network address of the electronic document pointed to by the link, and the time stamp field 306 contains the date and time when the electronic document was accessed (by clicking the link on the base electronic document). After step 418, the method 400 proceeds to step 408, where the electronic document pointed to by the link is retrieved. Returning to step 412, if the event is not to click on the link, the method 400 proceeds to process other events at step 420 and returns to retrieve the next event at step 404.

Referring to FIG. 5, the method 500 embodies a task for displaying an electronic document. After the method 500 is entered from step 410, the method 500 starts at step 502 and proceeds to step 504, where a query determines whether there is more content, i.e., data or information, to render while displaying the electronic document or web page. If there is more content to render, the method 500 proceeds to step 506, where a query determines whether the content to render is a link. If the content to render is not a link, the method 500 proceeds to step 508, where content is provided for the electronic document in a normal manner. In this case, step 508 may provide any type of content or information other than a link, e.g., text, graphic files and audio files.

If the content to render is a link, the method 500 proceeds to step 510, where a query determines whether the electronic document pointed to by the link was previously accessed from the current electronic document to be displayed. Step 510 initially determines whether the network address for the current electronic document is in the URL field 304 of the page data structure 130. For an electronic document entry having its network address in the URL field, step 510 also determines whether the network address for the electronic document pointed to by the link is in the forward visit field 308 of the page data structure 130. If the electronic document pointed to by the link was previously accessed or visited from the current web page, the method 500 proceeds to step 512, where the link is rendered in a first manner. After rendering the link at step 512, the method 500 returns to determine whether there is more content to render at step 504.

Returning to step 510, if the electronic document pointed to by the link was not previously accessed from the current electronic document, the method 500 proceeds to step 514, where a query determines whether a history mode is enabled in the browser program 128 or web browser. If the history mode is enabled, the method proceeds to step 516, where a query determines whether the electronic document pointed to by the link was previously accessed from a recently accessed electronic document. Step 516 initially determines whether an electronic document has a timestamp value in the time stamp field 306 that is above a threshold value indicative of the recently accessed electronic document. For an electronic document entry having its time stamp value above the threshold value, step 516 also determines whether a network address for the electronic document pointed to by the link is in the forward visit field 308 of the page data structure 130. Examples of recently accessed electronic documents may include electronic documents accessed in a current session of the browser program 218, and electronic documents in a Go menu 224 of a graphic user interface (GUI) 202. Such recently accessed electronic documents may also comprise electronic documents previous accessed within a time less than the time commonly utilized in the history mode of the browser program 218.

If the electronic document pointed to by the link was previously accessed from a recently accessed electronic document, the method 500 proceeds to step 512, where the link is rendered in the first manner. As such, the link is rendered in the first manner if the electronic document pointed to by the link was previously accessed from the current electronic document or a recently accessed electronic document. Such electronic documents may be considered as being visited "in context" with respect to the base electronic document containing the link. After rendering the link at step 512, the method 500 returns to determine whether there is more content to render at step 504.

If the electronic document pointed to by the link was not previously accessed or visited from a recently accessed electronic document, the method 500 proceeds to step 518. The method 500 also proceeds to step 518 if the history mode was disabled at step 514. At step 518, a query determines whether the electronic document pointed to by the link was previously accessed from another type of electronic document. Namely, step 518 determines whether the electronic document pointed to by the link is "out of context" with respect to the current electronic document containing the link. If the electronic document pointed to by the link was previously accessed from another type of electronic document, the method 500 proceeds to render the link in a second manner in step 520 and returns to determine whether there is more content to render at step 504. If the electronic document pointed to by the link was (also) not previously accessed from another type of electronic document, the method 500 proceeds to render the link in a third manner in step 520 and returns to determine whether there is more content to render at step 504.

In one embodiment, a link rendered in the first manner is displayed in a first formatting attribute, a link rendered in the second manner is displayed in a second formatting attribute, and a link rendered in the third manner is displayed in a third formatting attribute. These formatting attributes were previously described with respect to FIG. 2.

While the foregoing is directed to the preferred embodiment of the present invention, other and further embodiments of the invention may be devised without departing from the basic scope thereof, and the scope thereof is determined by the claims that follow.

What is claimed is:

1. A method for providing browsing information to a user browsing a plurality of network addresses using a browser program, the method comprising:

upon receiving, by the browser program, at least a portion of a first electronic document containing a link that points to a second electronic document:

displaying, in a browser window, the link in a first manner if the second electronic document was previously accessed from at least one of the first electronic document and a recently accessed electronic document;

displaying, in the browser window, the link in a second manner if the second electronic document was previously accessed from another electronic document other than at least one of the first electronic document and the recently accessed electronic document; and displaying, in the browser window, the link in a third manner if the second electronic document was previously unaccessed, wherein the first, second and third manners of displaying the link are visually distinctive to the user.

2. The method of claim 1, wherein displaying the link in the first manner comprises displaying the link in a first formatting attribute, wherein displaying the link in the second manner comprises displaying the link in a second formatting attribute, and wherein displaying the link in the third manner comprises displaying the link in a third formatting attribute.

3. The method of claim 2, wherein the first formatting attribute, the second formatting attribute and the third formatting attribute are distinguished by one of color, flashing buttons, numerical ratings, shading, highlighting, bolding, colors, icons and checkmarks.

4. The method of claim 1, wherein the first electronic document is located at a first network address of a network of computers and the second electronic document is located at a second network address of the network of computers.

5. The method of claim 4, wherein the network of computers comprises an Internet.

6. The method of claim 1, wherein the first electronic document comprises a first web page and the second electronic document comprises a second web page.

7. The method of claim 1, wherein displaying the link in a first manner comprises:

determining whether the second electronic document was previously accessed from the first electronic document.

8. The method of claim 7, wherein the step of determining comprises:

determining whether a first network address for the first electronic document is in a Uniform Resource Locator (URL) field of a page data structure; and determining, for an electronic document entry having the first network address in the URL field, whether a second network address for the second electronic document is in a forward visit field of the page data structure.

9. The method of claim 1, wherein displaying the link in a first manner comprises:

determining whether the second electronic document was previously accessed from the recently accessed electronic document.

10. The method of claim 9, wherein the step of determining comprises:

determining whether an electronic document has a timestamp value in the timestamp field of a page data structure that is above a threshold value indicative of the recently accessed electronic document; and determining, for an electronic document entry having the timestamp value above the threshold value, whether a second network address for the second web page is in a forward visit field of the page data structure.

11. The method of claim 1, wherein the recently visited electronic document comprises an electronic document accessed in a current session of a browser program.

12. The method of claim 1, wherein the recently visited electronic document comprises an electronic document in a Go menu of a graphic user interface (GUI) of a browser program utilized to access electronic documents.

13. The method of claim 1, wherein the second electronic document represents an electronic document in context with the first electronic document, if second electronic document was previously accessed from the first electronic document or the recently accessed electronic document.

14. An apparatus for providing contextual information, the apparatus comprising:
   a storage device for storing a browser program;
   a display for displaying a browser window of the browser program; and
   a microprocessor, coupled to the storage device, for executing a browser program retrieved from the storage device, and wherein a link contained in a first document and that points to a second electronic document, is displayed in the browser window in a first manner if the second electronic document was previously accessed from at least one of the first electronic document and a recently accessed electronic document, displayed in a second manner if the second electronic document was previously accessed from another electronic document other than at least one of the first electronic document and the recently accessed electronic document, and displayed in a third manner if the second electronic document was previously unaccessed.

15. The apparatus of claim 14, wherein the first, second and third manners are visually distinct from one another according to different formatting attributes.

16. The apparatus of claim 14, wherein the storage device stores a page data structure comprising a URL field and a timestamp field, where the URL field and timestamp field are provided for an electronic document entry.

17. The apparatus of claim 15, wherein the page data structure further comprises a forward visit field for the electronic document entry.

18. The apparatus of claim 14, wherein the first electronic document is located at a first network address of a network of computers and the second electronic document is located at a second network address of the network of computers.

19. The apparatus of claim 14, wherein the microprocessor determines whether the second electronic document was previously accessed from the first electronic document or the recently visited electronic document.

20. A computer readable medium storing a software program that, when executed by a computer, causes the computer to perform an operation upon receiving at least a portion of a first electronic document containing a link that points to a second electronic document[[;]], the operation comprising:
   displaying, in a browser window, the link in a first manner if the second electronic document was previously accessed from at least one of the first electronic document and a recently accessed electronic document;
   displaying, in the browser window, the link in a second manner if the second electronic document was previously accessed from another electronic document other than at least one of the first electronic document and the recently accessed electronic document; and
   displaying, in the browser window, the link in a third manner if the second electronic document was previously unaccessed, wherein the first, second and third manners of displaying the link are visually distinctive to the user.

21. The computer readable medium of claim 20, wherein displaying the link in the first manner comprises displaying the link in a first formatting attribute, wherein displaying the link in the second manner comprises displaying the link in a second formatting attribute, and wherein displaying the link in the third manner comprises displaying the link in a third formatting attribute.

22. The computer readable medium of claim 21, wherein the first formatting attribute, the second formatting attribute and the third formatting attribute are distinguished by one of color, flashing buttons, numerical ratings, shading, highlighting, bolding, colors, icons, and checkmarks.

23. The computer readable medium of claim 20, wherein the first electronic document is located at a first network address of a network of computers and the second electronic document is located at a second network address of the network of computers.

24. The computer readable medium of claim 23, wherein the network of computers comprises an Internet.

25. The computer readable medium of claim 20, wherein the first electronic document comprises a first web page and the second electronic document comprises a second web page.

26. The computer readable medium of claim 20, wherein displaying the link in a first manner comprises:
   determining whether the second electronic document was previously accessed from the first electronic document.

27. The computer readable medium of claim 26, wherein the step of determining comprises:
   determining whether a first network address for the first electronic document is in a Uniform Resource Locator (URL) field of a page data structure; and
   determining, for an electronic document entry having the first network address in the URL field, whether a second network address for the second electronic document is in a forward visit field of the page data structure.

28. The computer readable medium of claim 20, wherein displaying the link in a first manner comprises:
   determining whether the second electronic document was previously accessed from the recently accessed electronic document.

29. The computer readable medium of claim 28, wherein the step of determining comprises:
   determining whether an electronic document has a timestamp value in the timestamp field of a page data structure that is above a threshold value indicative of the recently accessed electronic document; and
   determining, for an electronic document entry having the timestamp value above the threshold value, whether a second network address for the second web page is in a forward visit field of the page data structure.

30. The computer readable medium of claim 20, wherein the recently visited electronic document comprises an electronic document accessed in a current session of a browser program.

31. The computer readable medium of claim 20, wherein the recently visited electronic document comprises an electronic document in a Go menu of a graphic user interface (GUI) of a browser program utilized to access electronic documents.

32. The computer readable medium of claim 20, wherein the second electronic document represents an electronic document in context with the first electronic document, if second electronic document was previously accessed from the first electronic document or the recently accessed electronic document.

33. A method for providing displaying links to a user browsing a plurality of network addresses using a browser program, the method comprising:

requesting, by the browser program, access to a first electronic resource containing a link that points to a second electronic resource; and displaying, in a browser window of the browser program, the link in one of at least three different formats, each format being visually distinct from the others; wherein a first format is indicative of the second electronic resource not having been previously accessed by the user, wherein a second format is indicative a first path by which the second electronic document was navigated to and wherein a third format is indicative a second path by which the second electronic document was navigated to, the first and second paths being different.

34. The method of claim 33, wherein the first path to the second electronic document is from one of the first electronic document and a recently accessed electronic document.

35. The method of claim 34, wherein the first path to the second electronic document is from an electronic document other than the first electronic document and a recently accessed electronic document.

* * * * *